Figure 1:
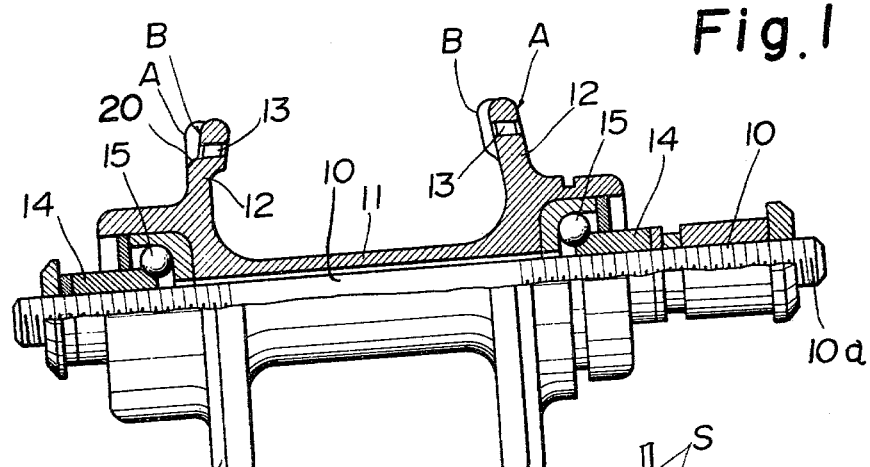

United States Patent [19]

Hasebe

[11] 4,300,804
[45] Nov. 17, 1981

[54] HUB FOR A TWO OR THREE WHEEL VEHICLE

[75] Inventor: Masayuki Hasebe, Sakai, Japan

[73] Assignee: Shimano Industrial Company, Limited, Osaka, Japan

[21] Appl. No.: 180,479

[22] Filed: Aug. 22, 1980

Related U.S. Application Data

[63] Continuation of Ser. No. 14,102, Feb. 22, 1979, abandoned.

[30] Foreign Application Priority Data

Feb. 28, 1978 [JP] Japan .............................. 53-26850[U]
Jun. 6, 1978 [JP] Japan .............................. 53-77576[U]
Feb. 2, 1979 [JP] Japan .............................. 54-13317[U]

[51] Int. Cl.³ ............................................ B60B 27/00
[52] U.S. Cl. ................................... 301/105 B; 301/56
[58] Field of Search ............................ 301/55, 59–61, 301/74–78, 105 B

[56] References Cited

U.S. PATENT DOCUMENTS 2,702,725 2/1955 Lyman .................................. 301/59
3,871,710 3/1975 Dian et al. ...................... 301/105 B

FOREIGN PATENT DOCUMENTS 95783 12/1897 Fed. Rep. of Germany .
371295 3/1907 France .
681713 5/1930 France ................................. 301/59
193200 3/1938 Switzerland .......................... 301/59
17142 of 1910 United Kingdom ............ 301/105 B Primary Examiner—H. Grant Skaggs
Attorney, Agent, or Firm—Stevens, Davis, Miller & Mosher

[57] ABSTRACT

A hub for a two or three wheel vehicle has at each axial side of a hub shell a respective hub flange which has first and second recessed portions displaced axially inwardly and outwardly of the hub shell. A first group of spoke bores comprising every other spoke bore of a hub flange is provided at the first portions while a second group of spoke bores each of which is arranged adjacent a spoke bore of the first group is provided at the second portions so that all the spokes used to form a wheel may be inserted into the bores from the axially inside side of each hub flange and drawn out from the axially outside side thereof.

2 Claims, 15 Drawing Figures

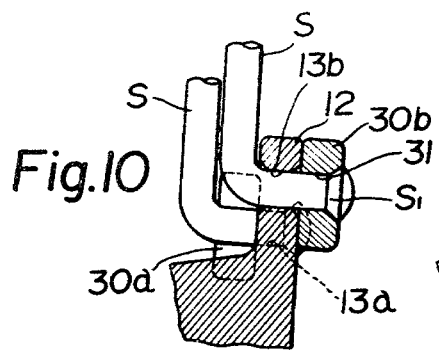
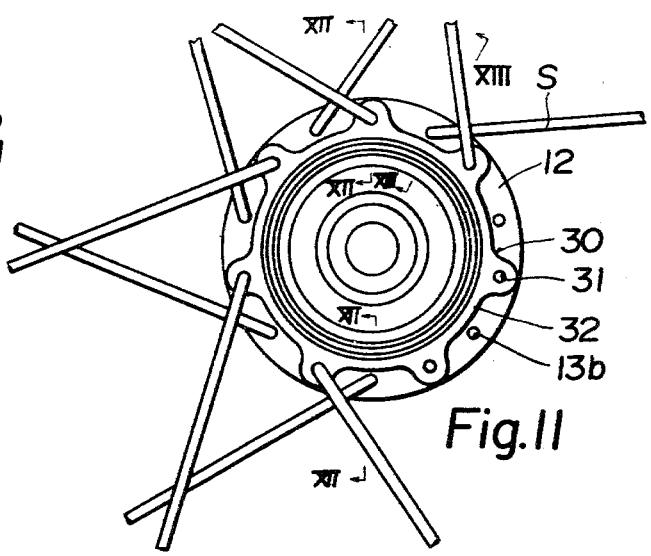
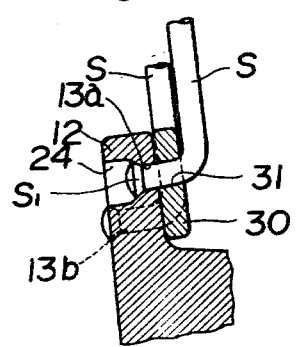
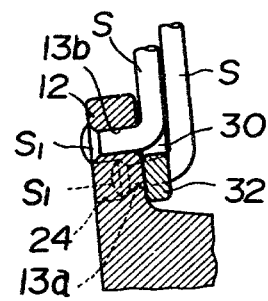
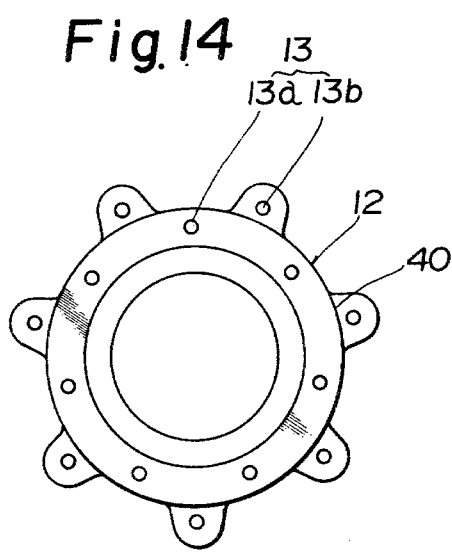
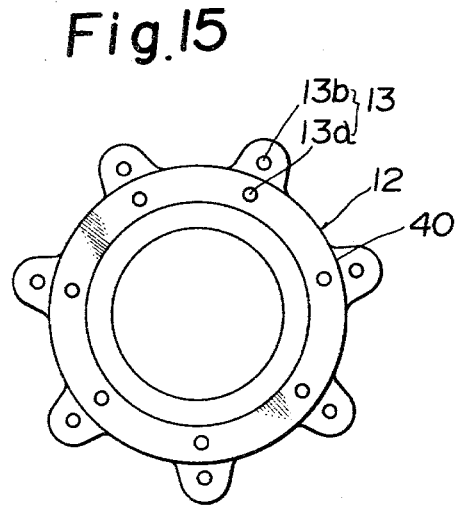

HUB FOR A TWO OR THREE WHEEL VEHICLE

This is a continuation of application Ser. No. 14,102, filed Feb. 22, 1979 (now abandoned).

This invention relates to a hub for a two or three wheel vehicle, and more particularly to a hub used for a bicycle, motorcycle or tricycle.

This kind of hub generally has a pair of hub flanges. Each of the hub flanges is formed as a disc provided at a respective axial end of a hub shell, and has in the vicinity of its outer periphery a large number of circumferential bores through which spokes are inserted and fixed at the tips thereof to a wheel rim, so that the hub, together with the rim and spokes, constitutes a wheel for a bicycle, motorcycle or tricycle.

The spoke bores of a conventional hub are formed at each hub flange and extend axially of the hub shell. They are also arranged in the same plane perpendicular to the axial direction of the hub flange.

In the conventional hub, the spokes should be inserted into the bores alternately from the axial inside and outside of each of the hub flanges and put together by the so-called alternate assembly. As a result, the so-called one-sided assembly, spoke insertion occurs from the axial inside only, is not available.

The well-known alternate assembly is divided into the so-called open type and cross type assemblies. The spokes in the open type assembly are inserted into the bores from the axial outside of the hub flange and from the axial inside thereof and extend crosswise without contacing with each other in extending to the wheel rim. Those in the cross type extend from the axial inside and outside of the hub flange and intersect to interchange the extending direction axially outwardly or inwardly of the hub flange and pressure contact with each other at each intersection.

The inside and outside spokes of the open type assembly, however, are spaced from one another at the intersections, whereby each independent spoke may be subjected to wind pressure when the bicycle is running. Furthermore, the spokes extending from the axial inside of each of the hub flanges are axially spaced at intervals smaller in length than those between the spokes from the axial outside by the thickness of the two hub flanges, thereby deteriorating the stiffness of each spoke.

The cross type assembly has the problem in that the spokes, which interchange outwardly or inwardly at the intersections, twist to bend thereat respectively, whereby vibrations or load-shifts cause noise generating friction between the spokes and also the stiffness of a spoke is reduced.

This invention has been designed to overcome these problems. An object of the invention is to provide a hub which permits one-sided spoke assembly, which mounts the spokes to the hub flanges at both axial sides of the hub shell at axially larger intervals while extending straight, and which allows all spokes to have an increased stiffness and be less affected by wind pressure.

The inventor has noticed that the spokes of a conventional hub cannot be inserted into the bores one-sidedly of the hub flange during wheel construction for the following reason. The spokes which are put together at the hub flange, are drawn-out in the direction of rotation of the driven hub as well as reversely thereto, and bear tension and compression respectively when connected to the rim so as to form the wheel. Since the spokes extend in different directions, they intersect when inserted into the bores at the hub flange one-sidedly from the axial inside thereof and drawn-out from the outside so that the spokes interfere with each other at the intersections.

Accordingly, the invention has designed an assembly which prevents interference at intersections by using first and second spoke mounting portions provided at the hub flange which are relatively axially displaced from one another. The first portions contain a first group of spoke bores conprising every other bore and the second portions contain a second group of spoke bores each of which is adjacent a bore of the first portions.

The invention is arranged such that the first and second portions are provided at the pair of hub flanges formed at both axial sides of the hub shell. The first and second portions are respectively displaced axially outwardly and inwardly of each of the hub flanges, with each first and second portion containing every other bore for a hub flange, that is, a bore of a first portion is flanked by bores of a second portion and vice versa. All the spokes are inserted through the bores one-sidedly from the axially inside side of the hub flange and are drawn out of the axially outside side thereof in the forward and reverse direction of hub rotation.

In addition, each of the spokes is made of wire material of a given length and of strong elasticity, is bent at its one lengthwise end at about a 90° angle, and has at the bent end a head larger in diameter than the wire. The spokes inserted into the bores at both the first and second portions are equal in length at the bending portions of the same.

Figure 2:
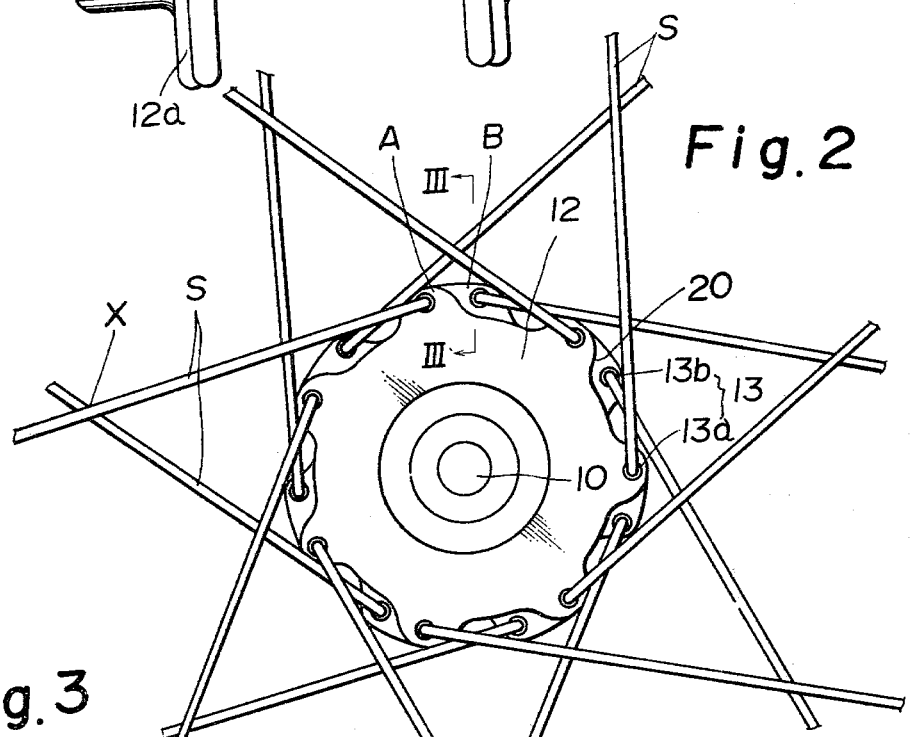
Figure 3:
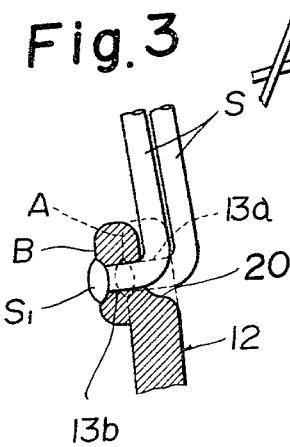
Figure 4:
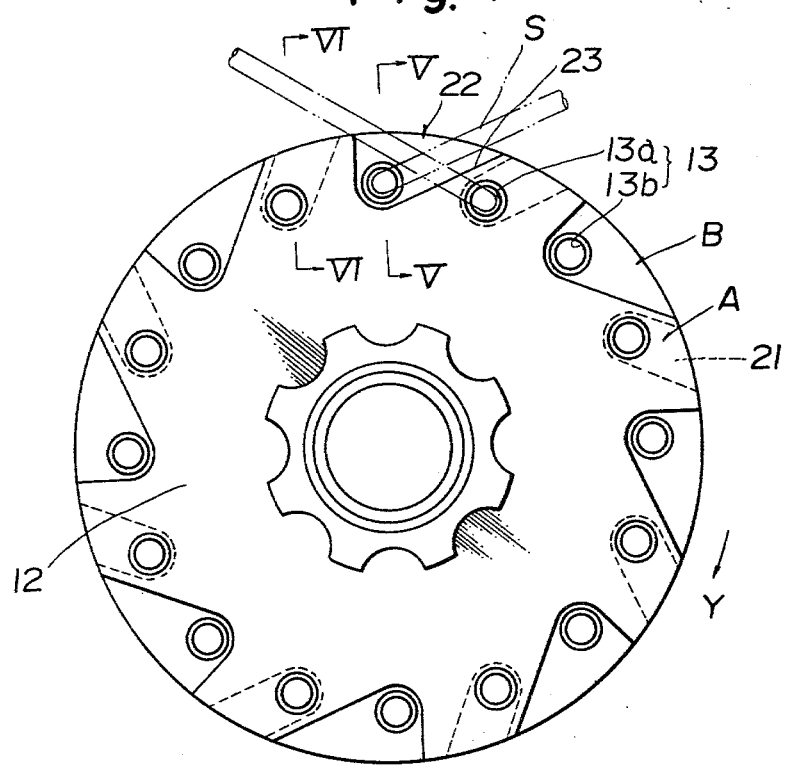
Figure 5:
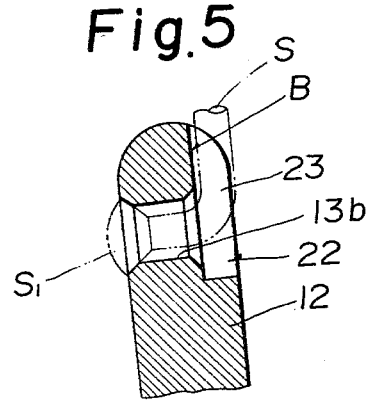
Figure 6:
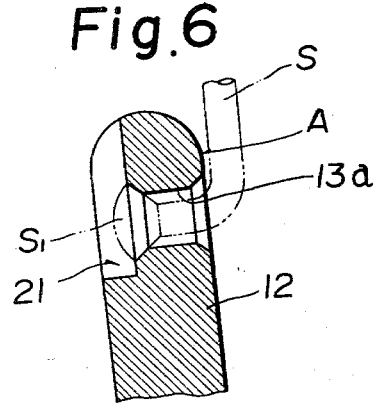
Figure 7:
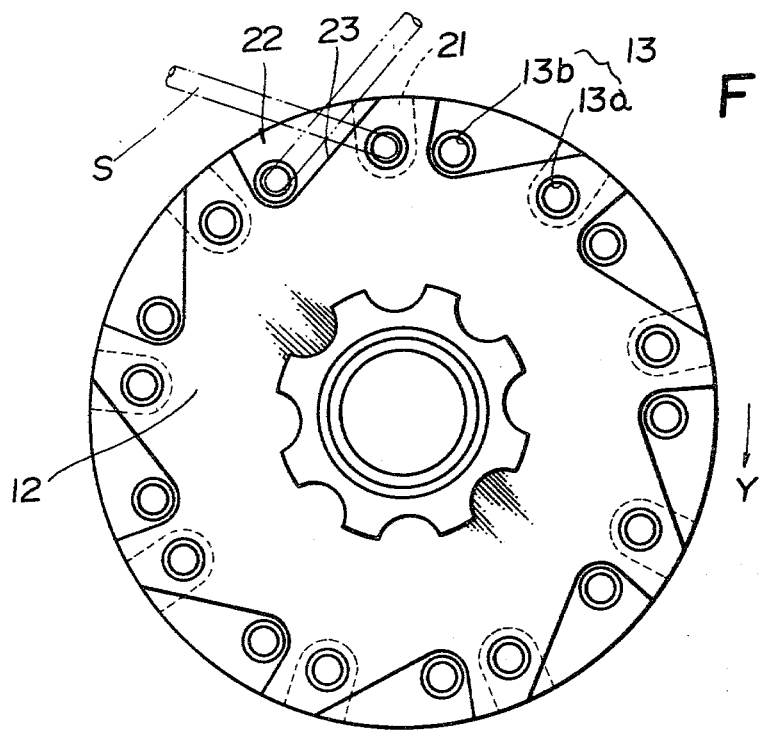
Figure 8:
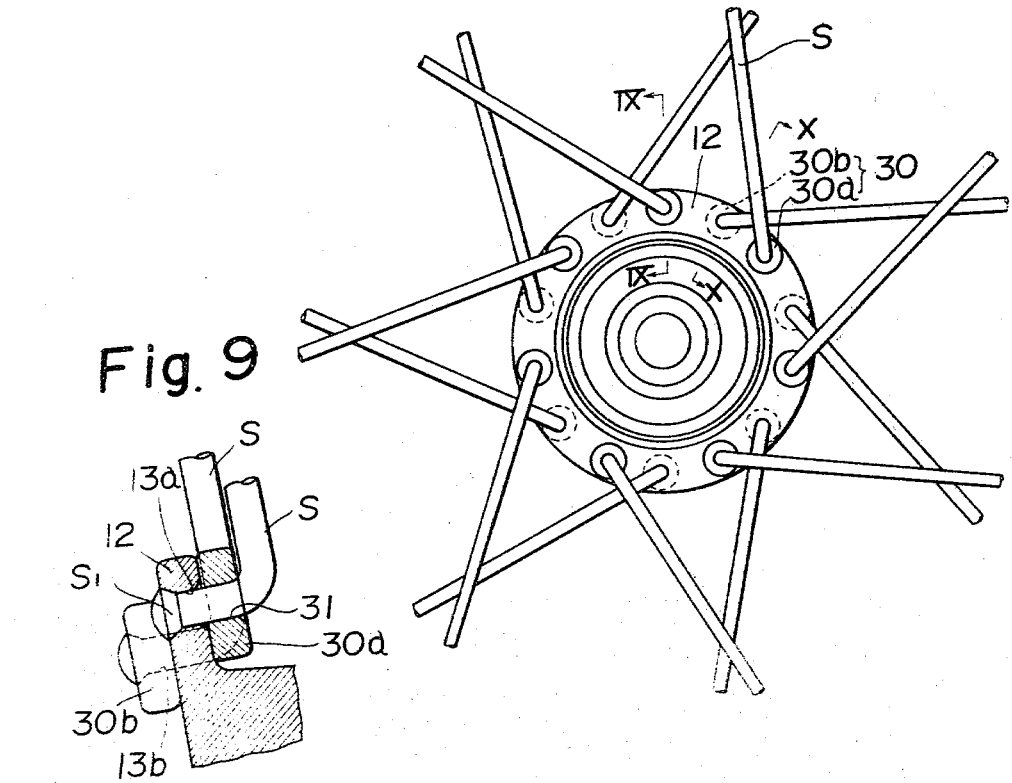
Figure 9:
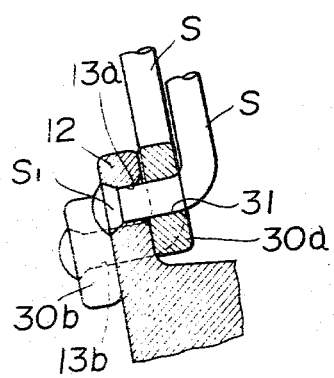

These and other objects, features and advantages of the invention will become more apparent upon a reading of the following detailed specification in conjunction with the accompanying drawings, in which FIG. 1 is a partially cutway front view of an embodiment of the hub of the invention, FIG. 2 is a side view of a hub flange in FIG. 1, showing mounting of spokes thereto, FIG. 3 is an enlarged sectional view taken on Line III—III in FIG. 2, FIG. 4 is a side view of a modification of the construction of FIGS. 1 through 3 and corresponds to FIG. 3, FIG. 5 is a sectional view taken on Line V—V in FIG. 4, FIG. 6 is a sectional view taken on Line VI—VI in FIG. 4, FIG. 7 is a side view of a modification of the construction shown in FIG. 4 and corresponds to FIG. 3, FIGS. 8 through 10 represent a modified embodiment of the hub of the invention, FIG. 8 is a side view thereof, corresponding to FIG. 3, FIG. 9 is an enlarged sectional view taken on Line IX—IX in FIG. 8, FIG. 10 is an enlarged sectional view taken on Line X—X in FIG. 8, FIG. 11 is a side view of a modification of the construction shown in FIG. 8, corresponding to FIG. 3, FIG. 12 is enlarged sectional view taken on Line XII—XII in FIG. 11, FIG. 13 is an enlarged sectional view taken on Line XIII—XIII in FIG. 11, FIGS. 14 and 15 are side views of other modified embodiments of the hub of the invention.

Referring to FIG. 1, reference numeral 1 designates a hub for a wheel of a two or three wheel vehicle, such as a bicycle, motorcycle or tricycle. The hub 1 comprises a hub shell 11 including at each axial end thereof a respective hub flanges 12, a hub shaft 10 rotatably supporting the hub shell 11, and a pair of bearing means through which the hub shell 11 is rotatably supported to the hub shaft 10.

The hub 1, wheel rim (not shown), and spokes S of intensely elastic wire, form the wheel of a two or three wheel vehicle, the hub 1 being positioned at the center of the rim and connected thereto through the spokes S.

Each of the hub flanges 12 has a disc-like shaped and is larger in diameter than the hub shell 11, is upright at the inner face to the hub shell 11, and has in the vicinity of its outer periphery a large number of spoke bores 13 extending axially of the hub shell 11, each of the bores 13 being arranged concentrically with respect to the axis of hub shell 11.

The bearing means comprise ball holders 14 and balls 15 respectively. The ball holders 14 are screwed with screw threads 10a at both axial ends of the hub shaft 10 respectively, so that the hub shell 11 is rotatably supported to the hub shaft 10 through the balls 15. The hub shaft 10 is fixed to the frame of a two or three wheel vehicle. The hub constructed as described is similar to conventional hubs for two or three wheel vehicles and its construction will be understandable without any further detailed description.

The hub of FIG. 1 constitutes the rear wheel of a bicycle and can be used similarly as a front wheel and is available for all two or three wheel vehicles other than a bicycle.

The invention divides the large numbers of spoke bores 13 at each of the hub flanges 12 into two groups, a first of which includes spoke bores 13a, which represent every other one of the bores 13, arranged at first portions A of the hub flange 12 and a second of which includes as spoke bores 13b, the remaining bores 13. The spoke bores 13b are the bores 13a of the first portions A, and are arranged at the second portions B of the hub flange, the first and second portions A and B being displaced from each other axially of the hub shell 11.

In detail, the hub flange 12 is, as shown in FIGS. 1 through 3, partially recessed at the peripheral portion axially inwardly thereof through stepped portions 20, thereby forming the second portions B, and other peripheral portions are left as the first portions A. In addition, the peripheral portion of hub flange may be axially outwardly recessed.

Alternatively, the hub flange 12, as shown in FIGS. 4 through 6, is made larger in thickness than normal and is, at the inner and outer surfaces of the peripheral portion thereof, cut out thicknesswise to form a large number of inner recesses 21 and outer recesses 22, thereby providing the first and second portions A and B displaced from each other axially of the hub shell 11, or a large number of washers 30 may, as shown in FIGS. 8 through 10, be supported in contact with both sides of the hub flange 12, thereby displacing the first and second portions A and B. Furthermore, the spoke bores 13 may, as shown in FIGS. 11 through 13, have a different axial length with washers 30 being arranged at the axial inside or outside of the hub flange 12, thereby forming the first and second portions A and B, or the hub flange 12 may, as shown in FIGS. 14 and 15, be provided with radially extending stepped noses 40 to displace the first and second portions axialy of the hub flange 12 and position them radially outwardly and inwardly thereof respectively.

It is to be noted that the spoke bores 13, which are arranged concentrically in the embodiments in FIGS. 1 through 15, are, except for those in FIGS. 14 and 15, spaced equally from the axis of the hub shell 11. In other words, all the spoke bores 13, as seen from FIGS. 3, 4, 7, 8 and 11, are on a phantom circle around the axis of hub shell 11. In this arrangement, the spokes S are made equal in length because of uniform distances between the bores and the wheel rim, and there is no need for the hub flange 12 to be increased in diameter. In addition, the invention is applicable to the first and second portions in FIGS. 14 and 15, which are relatively displaced radially of the hub flange 12. In this instance, the phantom circle connecting the spoke bores positioned radially outwardly of the hub flange should be larger in diameter than normal in consideration of a diameter of the hub shell 11. As a result, the spoke bores at the second portions B provided radially outwardly with respect to the first portions A, require a larger outer diameter of the hub flange 12. On the other hand, when all the spoke bores are arranged on one phantom circle, the outer diameter of hub flange 12 is a minimum, thereby increasing strength of the wheel and preventing deformation thereof even though the hub flange 12 is of smaller diameter.

In the hub embodiments described, all the spokes S are, as shown in FIG. 2, inserted into the bores 13 from the axial inside of the hub flange 12 and are put together thereat so that the heads of spokes S may contact with the axial inside of the hub flange respectively, and then are drawn out outwardly and tangentially of the hub flange 12. The spokes S intersect with each other on their way toward the rim as shown in FIG. 3 and then are fixed to the wheel rim (not shown). In this instance, the spokes inserted into the group of spoke bores 13a at the first portions A are drawn-out rearwardly with respect to the rotation of the driven hub 1 and those inserted into the group 13b are drawn-out in the reverse direction thereto, whereby each of the spokes at the first and second portions intersects on the way toward the rim, contacting with or approching each other, but the spokes S are not interchanged axially, i.e., outwardly or inwardly of the hub flange 12, at the intersections X respectively.

In other words, the spokes S drawn-out from the first portions A are all positioned outwardly with respect to those S from the second portions B, conversely speaking, the spokes S from the second portions B are all positioned inwardly with respect to those S from the first portions A, these spokes S contactng one another or spaced from one another by slight intervals at the intersections.

Accordingly, the hub of the invention allows the spokes to be stretched straight between the hub flanges and the wheel rim without twisting or bending at the intersections, and for the spacing of the spokes at axially larger intervals between both the hub flanges carrying the spokes, thereby improving stiffness of the spoke in comparison with the cross type assembly. Futhermore, the spokes at each of the hub flanges are displaced axially outwardly and inwardly thereof and either contact with each other or are spaced at slight intervals at the intersections thereby avoiding the presence of excessively wide intervals between intersecting spokes as in the open type assembly the lengths of intersecting portions of the spokes can be made larger, thereby minimizing the effect of wind pressure when the bicycle is running.

The above description has principally been presented relative to the embodiment of FIGS. 1 through 3. Next, modified construction for the hub of the invention will be described.

Referring to FIGS. 4 through 7, the spoke bores 13a at the first portions A are substantially equal in axial length to those 13b at the second portions B, and the first portions A are displaced axially outwardly of the hub shell 11 with respect to the second portions B as in the FIGS. 1 through 3 embodiment, but each of the hub flanges 12 is partially cut out at the inner and outer surfaces thereof to form the first and second portions A and B respectively. Namely, the hub flange 12 is cut out at its inner surface as shown in FIG. 6 to form inner recesses 21 serving as the first portions A and at the outer surface to form outer recesses 22 as the second portions B.

The outer recesses 22 are provided with guide faces 23 which extend in the direction of the drawn out spokes inserted into the bores at the second portions B as shown in FIGS. 4 through 7. The guide faces 23 are applicable to the embodiment shown in FIGS. 1 through 3, and also to an arrangement in which the hub flange 12 is partially axially outwardly swollen at the peripheral portion thereof to form the first portions A in place of the recesses 22 serving as the second portions B in FIGS. 4 through 7.

When the recesses 21 and 22 are, as shown in FIGS. 4 through 7, formed at the inner and outer surfaces of the hub flange 12 respectively, these recesses preferred do not overlap with each other axially of the hub flange 12. Hence, when a larger number of spokes are drawn out at a smaller angle with respect to the radius of hub flange 12 in comparison with those in FIG. 4, the spoke bores 13a at the first portions A and those 13b at the second portions B are circumferentially spaced at ununiform intervals respectively.

The guide faces 23 indicate the direction of drawing the spokes when assembed and are helpful to a worker, even an unskilled worker, to ensure the uniform assembly of the spokes which are drawn along the guide faces 23.

Accordingly, it is preferred to orient the guide faces 23 in the direction of rotation of the hub 1 when driven, i.e., in the arrow direction Y in FIG. 4. By doing this, the spokes S which transmit drive torque from the hub 1 to the wheel rim when the hub is driven, in other words, the spokes S, which are drawn rearwardly with respect to the rotation direction of the driven hub 1 and subjected to tension when the hub is driven, are always mounted to the first portions A displaced outwardly of the second portions B, whereby the spokes at the first portions A are mounted to the pair of hub flanges 12, 12 at axially larger intervals than normal, resulting in that the stiffness of each spoke against a transverse load applied thereto when the bicycle turns the corner, is improved.

Next, the embodiment of FIGS. 8 through 10 will be described. The spoke bores in this embodiment, similar to the former embodiments, are equal in axial length respectively and are arranged on one circle concentric with the axis of the hub shell 11, but the first and second portions A and B are axially displaced from each other by washers 30 which are provided at the center thereof with through holes 31 respectively. The washers 30 are, as shown in FIG. 8, formed of discs or square plates.

The washers 30 are divided into first washers 30a which are supported to the hub flange 12 in contact with the axially outer surface thereof and second washers 30b supported to the hub flange 12 in contact with the axially inner surface thereof, so that the first washers 30a form the first portions A as shown in FIG. 9, and the second washers 30b form the second portions B, as shown in FIG. 10.

The constitution shown in FIGS. 8 through 10 requires at the hub flanges 12 such as shown in FIGS. 1 through 7, thereby facilitating machining of the hub.

A modified arrangement using the washers 30 is shown in FIGS. 11 through 13. In this instance, the washers 30 are arranged only at the axially outer surface of the hub flange 12 and the plurality of washers 30 are not separated but incorporated as part of an annular connecting member 32.

In detail, in the embodiment in FIGS. 11 through 13, the spoke bores 13a at the first portions A are displaced axially outwardly of the hub flange 12, and the washers 30 are positioned outwardly of the bores 13a respectively.

It is to be noted that the displacement of the bores 13a means that the head $S_1$ of each of the spokes S is engaged with the bore 13a at a position thereof displaced axially of the hub flange 12. Thus, recesses 24 are provided, at the axially inner surface of the hub flange 12 into which are inserted the heads $S_1$ of spokes S.

Furthermore, the embodiments shown in FIGS. 14 and 15 have the first and second portions A and B, displaced radially of the hub flange 12 through stepped portions 40 respectively, so that the first portions A are positioned radially inwardly of the hub flange 12 and the second portions B, outwardly with respect to the first portions A.

In detail, the group of spoke bores 13a at the first portions A in FIG. 14 is arranged radially inwardly a relative to the axis of hub flange 12 with respect to the group of spoke bores 13b at the second portions B, and the bores 13a and 13b are displaced from each other circumferentially of the hub flange 12. In FIG. 15, the spoke bores 13a and 13b are aligned radially of the hub flange 12.

As many different embodiments of this invention may be made without departing from the spirit and scope thereof, it is to be understood that the invention is not limited to the specific embodiments described but only by the appended claims.

What is claimed is:

1. A wheel hub comprising:
a hub shell including a respective hub flange at each axial end thereof, said hub flanges having outer and inner sides relative to said hub shell and projecting radially outwardly of said hub shell and having a plurality of substantially equal axial length spoke bores extending axially of said hub shell and arranged on a concentric circle about the axis of said hub shell, each said hub flange including a plurality of first recessed portions on an outer axial side of said hub flange formed by stepped hub flange portions, each first recessed portion containing one of a first group of spoke bores comprising alternate ones of said spoke bores, and a plurality of recessed second portions on an inner axial side of said hub flange formed by stepped hub flange portions, each second recessed portion containing one of a second group of spoke bores comprising the remaining spoke bores, each of said spoke bores of said second group being adjacent a spoke bore of said first group, the interval of a hub flange in the circumferential direction thereof between a spoke bore of said first group and a spoke bore of a second group being non-uniform, said plurality of first recessed portions being displaced axially outward of said hub shell relative to said plurality of second recessed portions, each of said recessed portions on the outer side of a respective hub flange having guide faces directed forwardly in the rotating direction of said hub shell, when driven, for indicating the proper mounting direction for a spoke to be mounted in a spoke bore provided therein;

a hub shaft rotatably supporting said hub shell; and a pair of bearing means for rotatably supporting said hub shell to said hub shaft.

2. A wheel hub according to claim 1, wherein the number of first recessed portions and the number of second recessed portions at said hub flanges are equal.

* * * * *